Feb. 16, 1954  F. L. MILLER  2,669,248
REVERSE FLOW BY-PASS VALVE
Filed April 7, 1952  2 Sheets-Sheet 1

Inventor: F. L. Miller
By: [signature]
His Attorney

Feb. 16, 1954    F. L. MILLER    2,669,248
REVERSE FLOW BY-PASS VALVE
Filed April 7, 1952    2 Sheets-Sheet 2
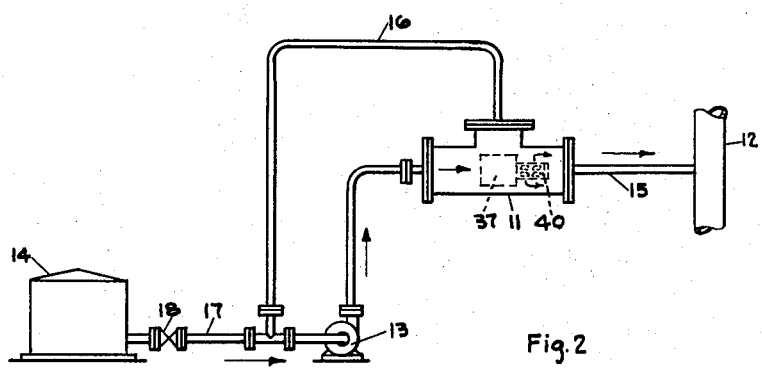
Fig. 2
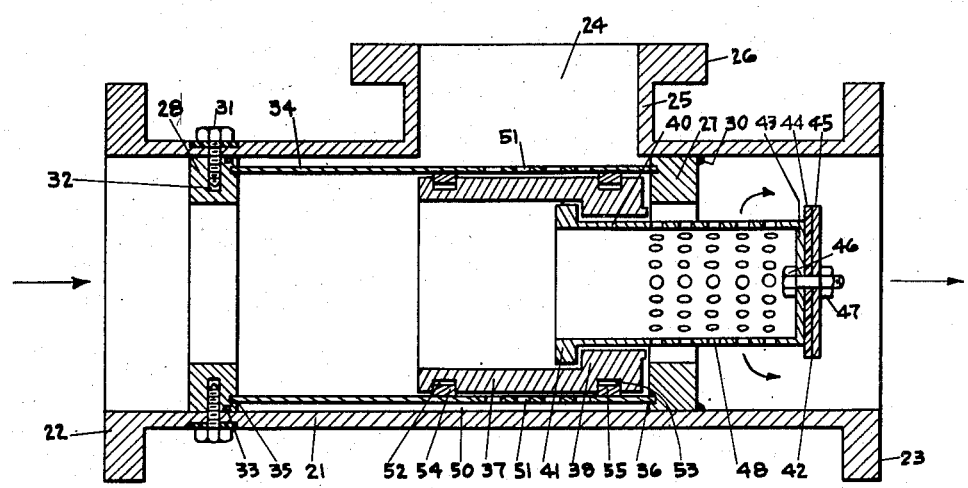
Fig. 4
Inventor: F. L. Miller
By 
His Attorney Patented Feb. 16, 1954

2,669,248

UNITED STATES PATENT OFFICE 2,669,248

REVERSE FLOW BY-PASS VALVE

Frank L. Miller, Zionsville, Ind., assignor to Shell Development Company, Emeryville, Calif., a corporation of Delaware Application April 7, 1952, Serial No. 280,865

4 Claims. (Cl. 137—87)

This invention relates to an automatic reverse flow system for the transportation of liquids, and pertains more particularly to a reverse flow by-pass valve structure used in said system, which is an improvement on the valve disclosed in U. S. Letters Patent 2,456,566 to Plank.

The system of the present invention is especially applicable to pipe line systems connecting a storage or terminal tank to a main pipe line where the liquid is transported between the pipe line and said tank by a single delivery line having attached to it, for the purpose of transporting liquid from the storage tank to main pipe line, a pump which must be by-passed when liquid is delivered from main pipe line to storage tank.

For this purpose, the pump in communication with the tank is usually by-passed by means of a by-pass line and a suitable valve arrangement to protect said pump, since certain types of pumps are damaged when run backwards by the force of the liquid being delivered. Other pumps are by-passed because they cannot be run backwards and thus prevent the liquid from entering the tank.

The above-mentioned pump by-pass line may have installed in it any desired type of manually operated or remote control valve. Since remote control valves and their means of operation often necessitate a considerable amount of inspection and maintenance, and since the use of manually operated valves is costly in requiring the use of operators, it is desirable to provide a flow system free of all elements that are not conducive to economical operations.

A by-pass valve suitable for the type of operations outlined above has been disclosed in U. S. Letters Patent 2,456,566 to Plank. The Plank valve has, however, the disadvantages, first, of requiring close tolerances which makes its manufacture relatively expensive, and, second, of causing excessive hammering due to the abrupt change of position of its heavy, single-piece valve or plug member.

It is therefore the object of this invention to provide an improved reverse flow by-pass valve comprising a telescoping, two-piece flow-directing valve or plug member whose action substantially eliminates or minimizes hammering.

Other objects of this invention will appear from the following description taken with reference to the attached drawings, wherein:

Figures 1 and 2 are schematic diagrams of a system employing the present valve in each of its two operating positions.

Figures 3 and 4 are longitudinal cross sectional views showing the construction of the reverse flow by-pass valve.

Figure 1:
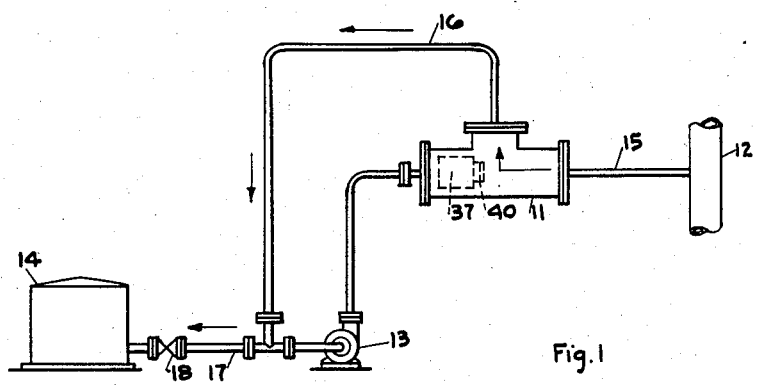

Referring to Figures 1 and 2 of the drawing, a system in which the present reverse flow by-pass valve structure 11 is employed may comprise a main pipe line 12, a pump 13 and a tank 14. The pipe line 12 is connected to the pump 13 and the tank 14 by means of a conduit or single delivery line 15, the present automatic valve 11, a pump by-pass line 16, and a branch line 17, which may be provided with a valve 18.

Figure 3:
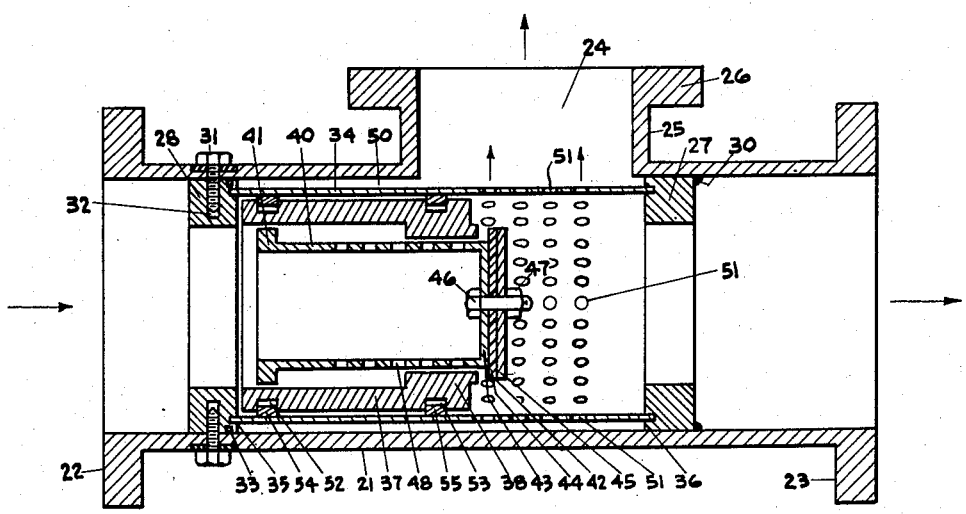

The reverse flow by-pass valve structure, as illustrated in Figures 3 and 4, comprises a cylindrical valve housing 21 having flanges 22 and 23 formed on or affixed in any suitable manner to opposite ends thereof. A fluid port 24 which is cut through the wall of said housing 21 is surrounded by a short pipe section 25 which may be welded to the housing, thus forming a T with the housing 21. A flange 26 is provided on this pipe section 25 for attaching the valve structure to by-pass line 16 (Figure 1). The flanges 22 and 23, at opposite ends of the valve structure, are connected to lines 17 and 15, respectively.

A pair of internal flanges or annular rings 27 and 28 (Figures 3 and 4) are secured in any suitable fluidtight manner to the inner wall of the housing 21. For example, one internal flange 27 may be fixedly welded, as at 30, to the housing 21 while the other internal flange 28 may be removably attached to the housing 21 by a plurality of screws or bolts 31 threaded through the housing 21 into tapped holes 32 in the flange 28. Preferably, at least one of the internal flanges 27 and 28 is secured within the valve housing 21 in a removable manner for easy disassembly of the valve for maintenance purposes. The removable flange 28 may be provided with a recessed O-ring seal 33 for forming a fluidtight seal with the inner wall of the housing 21.

Disposed concentrically within the valve housing 21 between the internal flanges 27 and 28 is a liner or sleeve 34 whose ends may be recessed in grooves cut in adjacent faces of the flanges 27 and 28, as shown at 35 and 36. Mounted for sliding movement within the sleeve 34 between flanges 27 and 28 is a piston 37 having both ends open with an internal flange 38 formed at one open end. Slidably mounted within the piston 37 and extendable through the flanged end 38 thereof is a secondary or pilot piston 40 provided with external flanges 41 and 42 which act as stops when they contact opposite sides of flange 38 on piston 37, thus limiting the movement of the secondary piston 40.

The end closure 43 of the secondary piston 40 abuts a flange 42 which may be formed of one or more discs 44 and 45 having a diameter larger than the piston 40, said discs being bolted to said piston by bolt 46 and nut 47. Preferably, the seating disc 44 is made of a plastic or non-metallic material which can seat against the flange 38 in a fluidtight manner. The cylindrical wall of the secondary piston is provided with a plurality of ports 48 over the major portion thereof to permit the passage of fluid therethrough when the secondary piston is in its extended position as shown in Figure 4. The secondary piston 40 is preferably not longer than piston 37 and has a length such that the seating disc 44 contacts flange 38 of a piston 37 in its fully retracted position. For illustration purposes the piston 40 is shown in its partially retracted position in Figure 3. The diameter of the secondary piston 40 is of a size to form a substantially fluidtight fit with the flange 38 of piston 37.

The liner or sleeve 34 is preferably arranged in concentric spaced relationship with the bore of the valve housing whereby an annular fluid passageway 50 is formed between the sleeves 34 and the inner wall of the housing 21. It is realized, however, that the present valve can operate, although with a smaller flow therethrough, if the sleeve 34 is not spaced from the housing 21 to form annular space 50, but on the other hand fits snugly within the bore of the housing 21. The sleeve 34 is approximately about twice the length of the piston 37 or the diameter of side port 24. The portion of the sleeve 34 adjacent the port 24 is provided with a plurality of holes 51 which preferably extend in circumferential rows entirely around the sleeve, as shown in Figure 3, whereby fluid entering the sleeve 34 can rapidly pass through the perforations 51, into the annular fluid passageway 50 and out the port 24.

The piston 37 which is slidably mounted in the sleeve 34 is of a length sufficient to close all perforations 51 in said sleeve when the piston is at one limit of its travel and open the perforations 51 when it is at its other limit of travel. Preferably, the piston 37 is provided near either end thereof with circumferential grooves, 52 and 53 in the outer surface thereof for receiving sealing rings 54 and 55 which form a more positive fluidtight seal between the piston 37 and the inner wall of the sleeve 34.

In operation, the present reverse flow by-pass valve is installed in the discharge line 15 from the pump 13, as illustrated in Figures 1 and 2, with the pistons 37 and 40 tending to move away from the pump to allow the flow of fluid to pass axially through the valve housing 21. Assuming the pistons 37 and 40 to be in the position shown in Figure 3 when the pump is started, fluid enters housing 21 from the left, flows past flange 28, and enters the open end of the secondary piston 40. The fluid flow pushes the secondary piston 40 forward (to the right, as viewed) until external flange 41 on said piston 40 contacts the flange 38 on the main piston 37. Both pistons 37 and 40 then move forward together until the main piston 37 is stopped by the internal flange 27 secured to the housing 21, as illustrated. With the pistons 37 and 40 in the positions shown flange 27, the ports 51 in sleeve 34 are effectively sealed so that the flow of fluid continues through the ports 48 in the extended secondary piston 40 and out of the housing 21 into pipe line 15 (Figure 2).

When the flow through pipe line 15 is reversed and it is desired to deliver fluid from the main pipe line 12 to the storage tank 14 without going through the pump 13, the present reverse flow by-pass valve operates in the following manner. With the pistons 37 and 40 in the positions shown in Figure 4, a flowing fluid stream entering the housing at the right (as viewed) and flowing to the left, subjects the closed end 43 of the secondary piston 40 to sufficient pressure to force the piston 40 to the left within the main piston 37 until the seating plate 44 of the secondary piston 40 seats against the flange 38 of the main piston 37 effectively closing perforations 48 in the piston 40.

Both pistons 37 and 40 are then forced to the left under the pressure of the flow stream until they are stopped from further movement by the internal flange 28 as illustrated in Figure 3. At this time the perforations 51 in the sleeve are open allowing fluid entering the housing 21 from pipe line 15 to pass through said perforations 51, out port 24, into by-pass line and thence through line 17 and valve 18 into the storage tank 14.

In some pumping installations the relative position and height of the storage tank 14 and main pipe line 12 permit deliveries of fluid to be made by gravity from the storage tank when it is substantially full. Assuming that the pistons 37 and 40 are in the positions shown in Figure 3, fluid being delivered from storage tank 14 flows past valve 18 (Figure 1) through lines 17 and 16 and into the side port 24 of the valve 11. Since perforations 51 (Figure 3) are open, the fluid flows therethrough and out of the valve housing 21, into line 15 which connects with the main pipe line 12. Flow of fluid will continue in the above-described manner until the pressure in the line drops below the normal pressure requirements for delivery of fluid from the tank 14 (Figure 1) to pipe line 12. At this time, to complete the delivery, it is only necessary to start the pump 13. The pistons 37 and 40 are then pushed out to cover perforations 51 as shown in Figure 4 causing the pressure of fluid entering the valve housing 21 to equal the rated pressure of the pump, thus permitting the same amount of fluid to pass on to the pipe line 12 without manual assistance to attain the desired pressure for the remainder of the delivery.

It may be seen that the present reverse flow by-pass valve provides a 2-way valve structure of simple and sturdy design adapted to be opened in one direction at a time by the flow of fluid passing therethrough, the setting of the valve depending upon the direction in which the fluid enters the valve housing. The present valve operates efficiently and quietly at all times without chattering or causing hammering in the pump discharge line as is the case with many control valves. While the present valve has been illustrated as mounted for operation in a horizontal position, its design and construction permit mounting so that the piston travel is either in a horizontal or vertical plane, or at any desired angle thereto.

I claim as my invention:

1. A reverse flow by-pass valve for pipe lines comprising an elongated tubular housing having open ends for connection into a pipe line, radial port means through the wall of said housing intermediate the ends thereof for connection to a pipeline, first and second internal abutments affixed to the inner wall of said housing on opposite sides of said port means, a tubular sleeve mounted between said abutments, first aperture means through a portion of said sleeve adjacent said port means, a tubular main piston mounted for limited sliding movement within said sleeve between said abutments, said piston being open at both ends, internal abutment means formed at one end of said piston, a perforate tubular secondary piston telescopically mounted within said main piston and having a closed end extensible through the abutment means of said main piston, and external abutments at either end of said secondary piston adapted to engage the internal abutment means of said main piston.

2. A reverse flow by-pass valve for pipe lines comprising an elongated tubular housing having open ends for connection into a pipe line, radial port means through the wall of said housing intermediate the ends thereof for connection to a pipeline, first and second internal abutments affixed to the inner wall of said housing on opposite sides of said port means, a tubular main piston mounted for limited sliding movement within said abutments, said piston being open at both ends, internal abutment means formed at one end of said piston, a perforate tubular secondary piston telescopically mounted within said main piston and having a closed end extensible through the abutment means of said main piston, and external abutments at either end of said secondary piston adapted to engage the internal abutment means of said main piston.

3. A reverse flow by-pass valve for pipe lines comprising an elongated tubular housing having open ends for connection into a pipe line, radial port means through the wall of said housing intermediate the ends thereof, said port means being connectable to a by-pass pipe line, first and second flanges affixed to the inner wall of said housing on opposite sides of said port means, a tubular sleeve mounted between said flanges coaxially within said housing, first annularly dispersed aperture means through a portion of said sleeve adjacent said port means, a tubular main piston mounted for limited sliding movement within said sleeve between said flanges for opening and closing said first aperture means, said piston being open at both ends, an internal flange formed at one end of said piston, a tubular secondary piston slidably mounted within said main piston and having an open and a closed end extensible through the flanged end of the main piston, external flanges at either end of said secondary piston of a diameter to engage opposite sides of the internal flange of said main piston, and second annularly disposed aperture means through the wall of said secondary piston.

4. A reverse flow by-pass valve for pipe lines comprising an elongated tubular housing having open ends for connection into a pipe line, radial port means through the wall of said housing intermediate the ends thereof, said port means being connectable to a by-pass pipe line, first and second annular flanges affixed to the inner wall of said valve housing on opposite sides of said port means, a tubular sleeve mounted between said flanges in concentric spaced relationship with said valve housing, first annularly disposed aperture means through a portion of said sleeve adjacent said port means, a tubular main piston mounted for limited sliding movement within said sleeve between said flanges for opening and closing said first aperture means, said piston being open at both ends, an internal flange formed at one end of said piston, a tubular secondary piston slidably mounted within said main piston and having an open end and a closed end extensible through the flanged end of said main piston, external flanges at either end of said secondary piston of a diameter to engage the internal flange of said main piston, and second annularly disposed aperture means through the wall of said secondary piston, said apertures being closed to fluid flow when the secondary piston is in its retracted position.

FRANK L. MILLER.

References Cited in the file of this patent

UNITED STATES PATENTS

| Number | Name | Date |
|---|---|---|
| 1,697,352 | Ferris | Jan. 1, 1929 |
| 2,456,566 | Plank | Dec. 14, 1948 |
| 2,610,859 | Wilcox | Sept. 16, 1952 |